(12) United States Patent
Witkowski

(10) Patent No.: US 7,889,050 B2
(45) Date of Patent: Feb. 15, 2011

(54) SYSTEM AND METHOD FOR TRAINING A TRAINABLE TRANSMITTER

(75) Inventor: Todd R. Witkowski, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1048 days.

(21) Appl. No.: 11/514,360

(22) Filed: Aug. 31, 2006

(65) Prior Publication Data

US 2008/0068205 A1 Mar. 20, 2008

(51) Int. Cl.
*G06K 19/00* (2006.01)
*H04L 9/14* (2006.01)
*H04L 9/32* (2006.01)

(52) U.S. Cl. ............... 340/5.22; 340/825.22; 340/5.61; 340/825.72; 340/5.71; 340/5.25

(58) Field of Classification Search ............ 340/825.22, 340/825, 5.22, 5.21, 5.2, 5.1, 5.61, 5.6, 825.72, 340/825.71, 5.7, 5.71, 5.25
See application file for complete search history.

(56) References Cited

U.S. PATENT DOCUMENTS

| | | | |
|---|---|---|---|
| 5,442,340 A | | 8/1995 | Dykema |
| 5,479,155 A | | 12/1995 | Zeinstra et al. |
| 5,583,485 A | | 12/1996 | Van Lente et al. |
| 5,614,891 A | | 3/1997 | Zeinstra et al. |
| 5,661,804 A | * | 8/1997 | Dykema et al. ............. 380/274 |
| 5,686,903 A | | 11/1997 | Duckworth et al. |
| 5,699,054 A | | 12/1997 | Duckworth |
| 5,708,415 A | | 1/1998 | Van Lente et al. |
| 5,854,593 A | * | 12/1998 | Dykema et al. ........ 340/825.22 |
| 5,903,226 A | | 5/1999 | Suman et al. |
| 5,940,000 A | | 8/1999 | Dykema |

(Continued)

FOREIGN PATENT DOCUMENTS

EP  1 875 333 A  1/2008

(Continued)

OTHER PUBLICATIONS

International Search Report and Written Opinion for International Patent Application No. PCT/US2007/076870, mailed Feb. 19, 2008, 10 pages.

(Continued)

*Primary Examiner*—Brian A Zimmerman
*Assistant Examiner*—An T Nguyen
(74) *Attorney, Agent, or Firm*—Foley & Lardner LLP

(57) ABSTRACT

A method for training a trainable transmitter in a vehicle that includes receiving a request to enter a training mode of the trainable transmitter from a user, beginning a training mode of the trainable transmitter, receiving a control signal from an original transmitter associated with a remote control system, detecting a frequency and control data of the control signal. The method further includes determining if the control signal is a fixed code signal or a rolling code signal. If the control signal is a fixed code signal, storing the detected frequency and control data. If the control signal is a rolling code signal, comparing the detected control signal frequency to a plurality of predetermined frequencies and based on the comparison, shifting the detected frequency to match one of the predetermined frequencies.

20 Claims, 4 Drawing Sheets

U.S. PATENT DOCUMENTS

| | | | |
|---|---|---|---|
| 6,028,537 A | | 2/2000 | Suman et al. |
| 6,091,343 A | * | 7/2000 | Dykema et al. ........ 340/825.69 |
| 6,137,421 A | | 10/2000 | Dykema |
| 2005/0026604 A1 | | 2/2005 | Christenson et al. |
| 2006/0226949 A1 | * | 10/2006 | Reene ....................... 340/5.25 |

FOREIGN PATENT DOCUMENTS

| | | |
|---|---|---|
| GB | 2 277 620 A | 11/1994 |
| GB | 2 300 945 A | 11/1996 |
| GB | 2 302 751 A | 1/1997 |
| GB | 2 305 281 A | 4/1997 |
| GB | 2 305 282 A | 4/1997 |
| GB | 2 315 893 A | 2/1998 |
| GB | 2 322 215 A | 8/1998 |
| JP | 6-355054 A | 2/1994 |
| WO | WO 2004/077729 A2 | 9/2004 |
| WO | WO 2004077729 A2 * | 9/2004 |
| WO | WO 2005/002080 A1 | 1/2005 |
| WO | WO 2008/027824 A2 | 3/2008 |

OTHER PUBLICATIONS

Office Action for European Application No. 07841387.9, dated Feb. 4, 2010, 4 pages.

\* cited by examiner

SYSTEM AND METHOD FOR TRAINING A TRAINABLE TRANSMITTER

FIELD

The present invention relates generally to the field of trainable transmitters or transceivers for use with vehicles. More specifically, the present invention relates to trainable transmitters or transceivers that are configured for use with remote control systems.

BACKGROUND

Electronically operated remote control systems, such as garage door opener systems, home security systems, home lighting systems, gate controllers, etc., typically employ a portable, hand-held transmitter (i.e., an original transmitter) to transmit a control signal to a receiver located at the remote control system. For example, a garage door opener system typically includes a receiver located within a home owner's garage and coupled to the garage door opener. A user presses a button on the original transmitter to transmit a radio frequency signal to the receiver to activate the garage door opener to open and close a garage door. Accordingly, the receiver is tuned to the frequency of its associated original transmitter and demodulates a predetermined code programmed into both the original transmitter and the receiver for operating the garage door. To enhance security of wireless control systems, such as a garage door opener system, manufacturers commonly use encryption technology to encrypt the radio frequency signal sent from a transmitter to a receiver. One such encryption method is a rolling code system, where each digital message sent from the transmitter to the receiver has a different code from the previous digital message.

As an alternative to a portable, hand-held original transmitter, a trainable transmitter or transceiver may be provided in a vehicle for use with remote control systems. A trainable transmitter or transceiver is configurable by a user to activate one or more of a plurality of different remote control system receivers using different radio frequency messages. A user may train the trainable transmitter to an existing original transmitter by holding the two transmitters in close range and pressing buttons on the original transmitter and the trainable transmitter. The trainable transmitter identifies the type of remote control system (e.g., fixed or rolling code) associated with the original transmitter based on a radio frequency signal received from the original transmitter. The trainable transmitter may then identify and store the control code and RF carrier frequency of the original transmitter radio frequency control signal. In addition, the receiver may learn a transmitter identifier of the trainable transmitter. For systems employing a rolling code (or other encryption method), the trainable transceiver and receiver must also be "synchronized" so that the counters of the trainable transmitter and the receiver begin at the same value. Accordingly, the user presses a button on the remote control system receiver to put the receiver in a training mode. A button on the trainable transceiver may then be pressed, for example, two to three times, to transmit messages so the receiver may learn the transmitter identifier, complete synchronization of the receiver and the trainable transmitter and confirm that training was successful. Once trained, the trainable transceiver may be used to transmit RF signals to control the remote control system.

During training, the accuracy of the frequency learned and stored by the trainable transmitter depends on the frequency of the control signal transmitted by the original transmitter. The frequency of the original transmitter signal may be, for example, lower than intended due to sources of error at the original transmitter. In addition, error in the learned frequency may be introduced during the training process. During training, it may also be difficult to know the desired frequency of a fixed code system due to the number of fixed code systems which have different operating frequencies. Typically, while training to a fixed code system, the system manufacturer (or brand of system) is not identified by the trainable transceiver. Rather, the control code and frequency of the signal received from the original transmitter is determined and then stored. As a result, if frequency snapping is used while training to a fixed code system, it may be possible to inadvertently "snap off" the desired frequency of operation and adversely affect performance. In contrast, while training to a rolling code system, the system manufacturer is typically identified based on the received original transmitter control signal in order to determine the appropriate rolling code data (e.g., encryption key, etc.) for the remote control system.

There is a need, therefore, for a system and method to shift, "snap" or change the frequency learned from an original transmitter control signal to the intended carrier frequency for the remote control system being trained to during training of the trainable transmitter. There is also a need for a system and method that only shifts, "snaps" or changes the frequency learned from an original transmitter control signal when training to a rolling code system.

SUMMARY

In accordance with an embodiment, a method for training a trainable transmitter in a vehicle includes receiving a request to enter a training mode of the trainable transmitter from a user, beginning a training mode of the trainable transmitter, receiving a control signal from an original transmitter associated with a remote control system, detecting a frequency and control data of the control signal, determining if the control signal is a fixed code signal or a rolling code signal, if the control signal is a fixed code signal, storing the detected frequency and control data, and if the control signal is a rolling code signal, comparing the detected control signal frequency to a plurality of predetermined frequencies and based on the comparison, shifting the detected frequency to match one of the predetermined frequencies.

In accordance with another embodiment, a trainable transmitter includes a receiver configured to receive signals and a control circuit coupled to the receiver and configured to receive a control signal from an original transmitter via the receiver, to detect a frequency and control data of the control signal, to determine if the control signal is a fixed code signal or a rolling code signal and if the control signal is a fixed code signal, to store the detected frequency and control data and if the control signal is a rolling code signal, to compare the detected control signal frequency to a plurality of predetermined frequencies and based on the comparison, shifting the detected frequency to match one of the predetermined frequencies.

DETAILED DESCRIPTION

Figure 1:
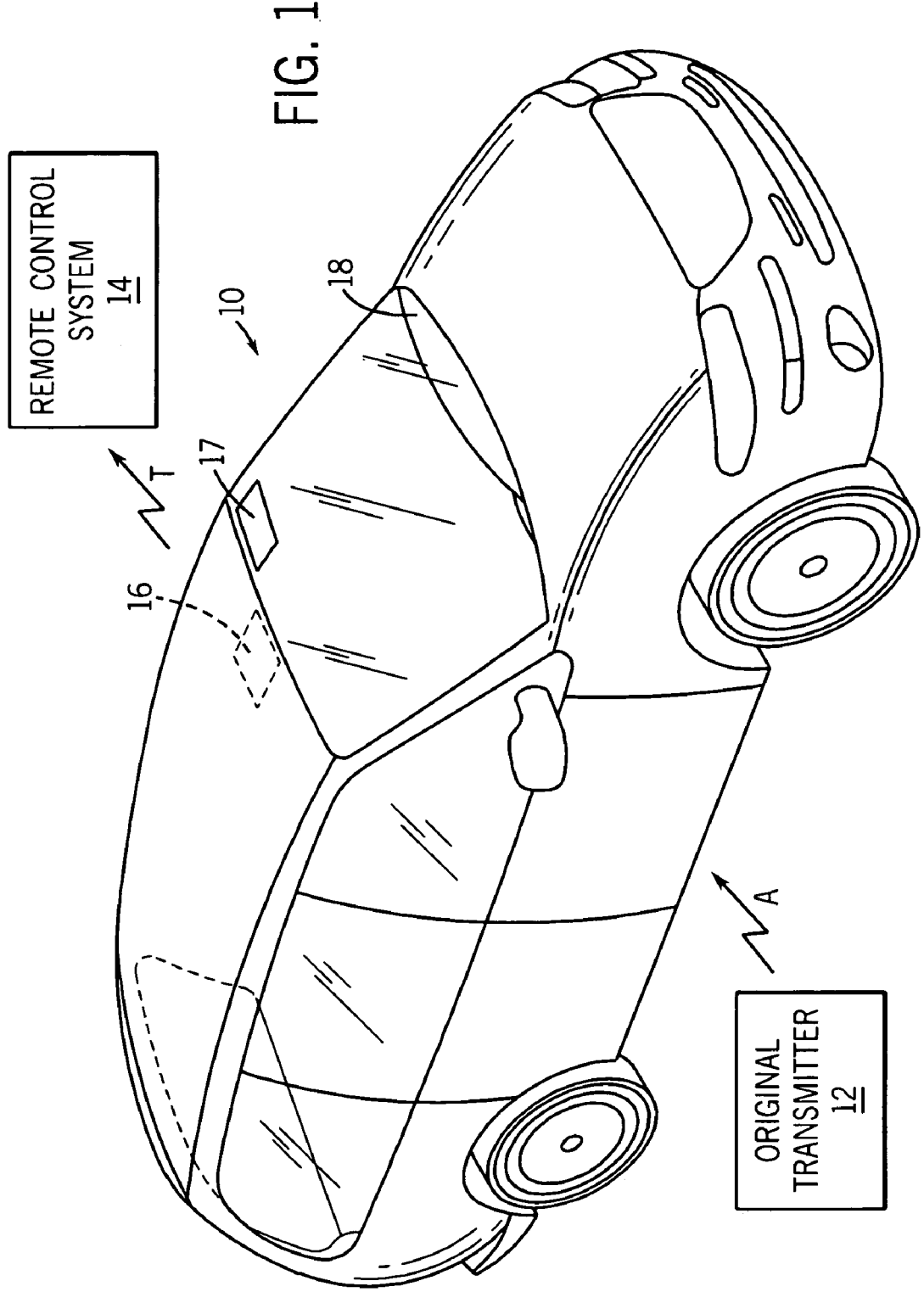
FIG. 1 is a perspective view of a vehicle having a trainable transmitter in accordance with an embodiment.

FIG. 1 is a perspective view of a vehicle including a trainable transmitter (or transceiver) in accordance with an embodiment. A vehicle 10, which may be an automobile, truck, sport utility vehicle (SUV), mini-van, or other vehicle, includes a trainable transmitter 16. In alternative embodiments, a trainable transmitter may be embodied in other systems such as a portable housing, key fob, key chain, or other hand-held device. In FIG. 1, trainable transmitter 16 is illustrated mounted to an overhead console of vehicle 10. Alternatively, one or more of the elements of trainable transmitter 16 may be mounted to other vehicle interior elements such as a visor 17, an instrument panel 18, a rearview mirror (not shown), a dashboard seat, center console, door panel, or other appropriate location in the vehicle.

Trainable transmitter 16 may be configured to control a remote control system 14, such as a garage door opener, home security system, home lighting system, gate controller, etc. Trainable transmitter 16 is trained using an original transmitter 12 used to control remote control system 14. Original transmitter 12 is a transmitter, typically a hand-held transmitter, which is sold with remote control system 14 or as an after-market item, and which is configured to transmit an activation signal at a predetermined carrier frequency and having control data configured to actuate remote control system 14. For example, original transmitter 12 can be a hand-held garage door opener transmitter configured to transmit a garage door opener signal at a frequency, such as 355 Megahertz (MHz), wherein the activation signal has control data, which can be fixed code or cryptographically-encoded code (e.g., a rolling code). In this example, remote control system 14 may be a garage door opener system configured to open a garage door in response to receiving the activation signal from original transmitter 12. Accordingly, remote control system 14 includes an antenna (not shown) for receiving wireless signals including control data which would control remote control system 14.

To train trainable transmitter 16, an activation or control signal A is transmitted from original transmitter 12 to trainable transmitter 16 in the vehicle 10. Trainable transmitter 16 receives the control signal, identifies the control data (e.g., the fixed or rolling code data) and carrier frequency of the control signal and stores this information. Trainable transmitter 16 may then be used to selectively generate a control signal T based on the learned frequency and control data and to transmit the control signal T to the remote control system 14, such as a garage door opener, that is responsive to the control signal. The training and operation of trainable transmitter 16 is discussed in further detail below.

Figure 2:
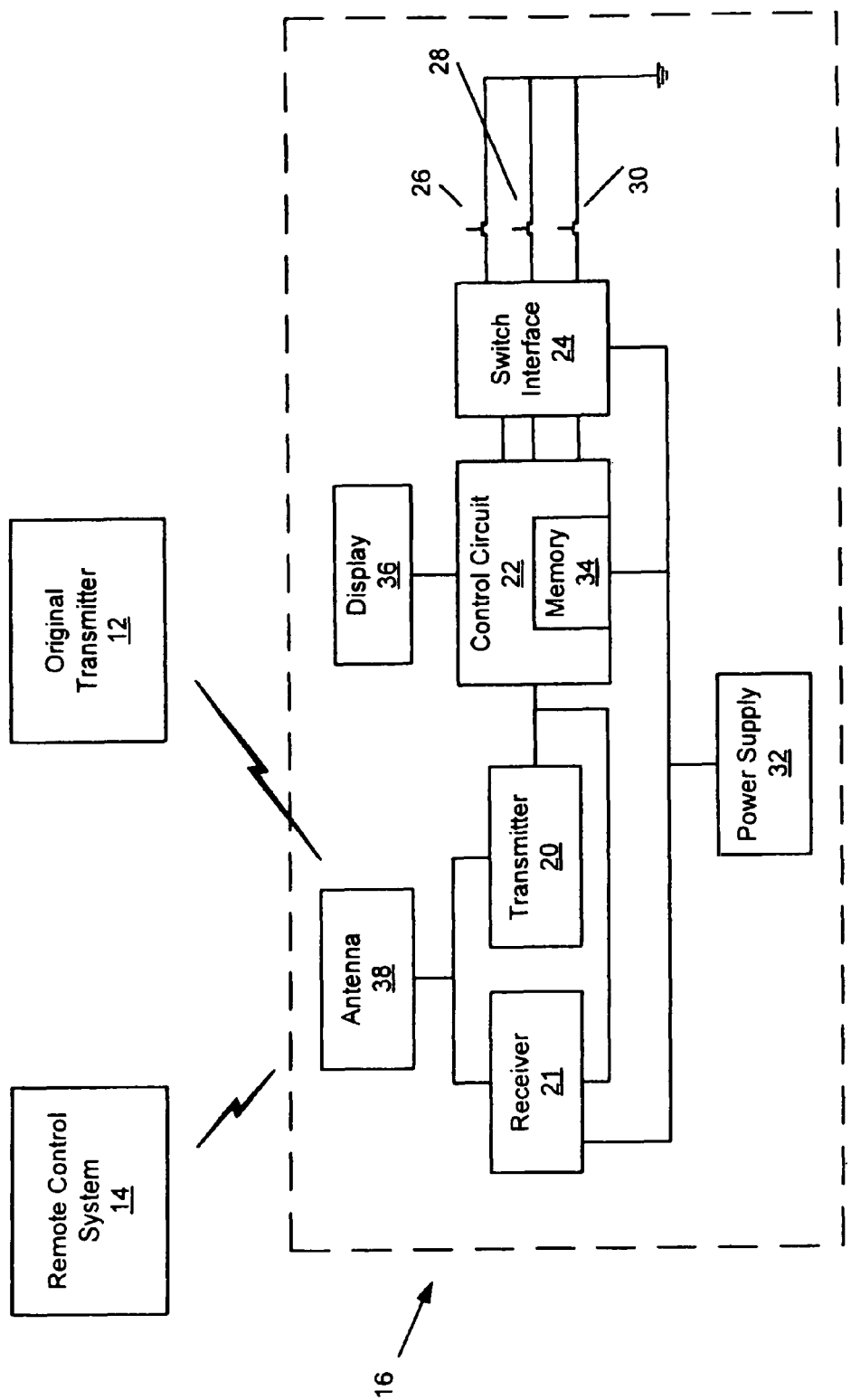
FIG. 2 is a schematic block diagram of a trainable transmitter in accordance with an embodiment.

FIG. 2 is a schematic block diagram of a trainable transmitter in accordance with an embodiment. Transmitter 16 includes a transmitter circuit 20 and a receiver 21 that are coupled to an antenna 38. In another embodiment, a single dual function transceiver having transmit and receive circuitry may be provided in place of a separate receiver and transmitter. Transmitter circuit 20 and receiver 21 are also coupled to a control circuit 22. Control circuit 22 may include various types of control circuitry, digital and/or analog, and may include a microprocessor, microcontroller, application specific integrated circuit (ASIC), or other digital and/or analog circuitry configured to perform various input/output, control, analysis and other functions to be described herein. A switch interface 24 is coupled to a plurality of buttons or switches. Alternatively, other user input devices such as knobs, dials, etc., or a voice actuated input control circuit configured to receive voice signals from a vehicle occupant may be provided to receive user input. In an exemplary embodiment, switch interface is coupled to one terminal of each of three push button switches 26, 28 and 30, which have their remaining terminal connected to ground. Switches 26, 28 and 30 may each be associated with a separate remote control system to be controlled, each of which may have its own unique operating RF frequency, modulation scheme, and/or control data. Thus, switches 26, 28, and 30 each correspond to a different radio frequency channel for transmitter circuit 20. It should be understood, however, that each channel may be trained to the same original transmitter, if desired, or to different original transmitters.

Interface circuit 24 couples signal information from switches 26, 28 and 30 to the input terminals of control circuit 22. Control circuit 22 includes data input terminals for receiving signals from the switch interface 24 indicative of the closure states of switches 26, 28 and 30. A power supply 32 is conventionally coupled to the various components for supplying the necessary operating power in a conventional manner.

Control circuit 22 is also coupled to a display 36 which may include a display element such as a light emitting diode (LED). Display 36 may alternatively include, for example, a liquid crystal display (LCD), a vacuum fluorescent display (VFD), or other display elements. Control circuit 22 includes a memory 34 including volatile and/or non-volatile memory to, for example, store a computer program or other software to perform the functions described herein. Memory 34 is configured to store learned information such as control data and carrier frequency information that may be associated with switches 26, 28 and 30. In addition, for rolling code or other cryptographically encoded remote control systems, information regarding the rolling code or cryptographic algorithms for each system may be pre-stored and associated with frequencies and control data that may be used to identify a particular type of remote control system and, therefore, the appropriate cryptographic algorithm for the remote control system. As discussed previously, each switch or button 26, 28 and 30 may be associated with a separate remote control system, such as different garage door openers, electronically operated access gates, house lighting controls and other remote control systems, each which may have its own unique operating RF frequency, modulation scheme, encryption (or cryptographic) algorithm and control data.

Transmitter circuit 20 and receiver 21 communicate with remote control system 14 and original transmitter 12 via antenna 38. Receiver 21 may be used to receive signals via antenna 38 and transmitter circuit 20 may be used to transmit signals via antenna 38. In an alternative embodiment, a separate antenna may be used with transmitter 20 and with receiver 21 (e.g., separate transmit and receive antennas may be provided in the trainable transmitter). Remote control system 14 includes a receiver (not shown) to receive signals such as an RF control signal from, for example, original transmitter 12 or trainable transmitter 16. Once a channel of trainable transmitter 16 has been trained, trainable transmitter 16 is configured to transmit a wireless control signal having control data that will control remote control system 14. For example, in response to actuation of a switch, such as switch 26, transmitter circuit 20 is configured, under control from control circuit 22, to generate a control signal having a carrier frequency and control data associated with the particular trained channel. The control data may be modulated onto the control signal using, for example, frequency shift key (FSK) modulation, amplitude shift key (ASK) modulation or other modulation technique. The control data on the control signal may be a rolling code or other cryptographically encoded control code suitable for use with remote control system 14. As mentioned previously, the rolling code or cryptographic algorithm, for remote control system 14 may be identified by trainable transmitter 16 using one or more characteristics of the control signal (e.g., the carrier frequency and control data) of original transmitter 12.

Figure 3:
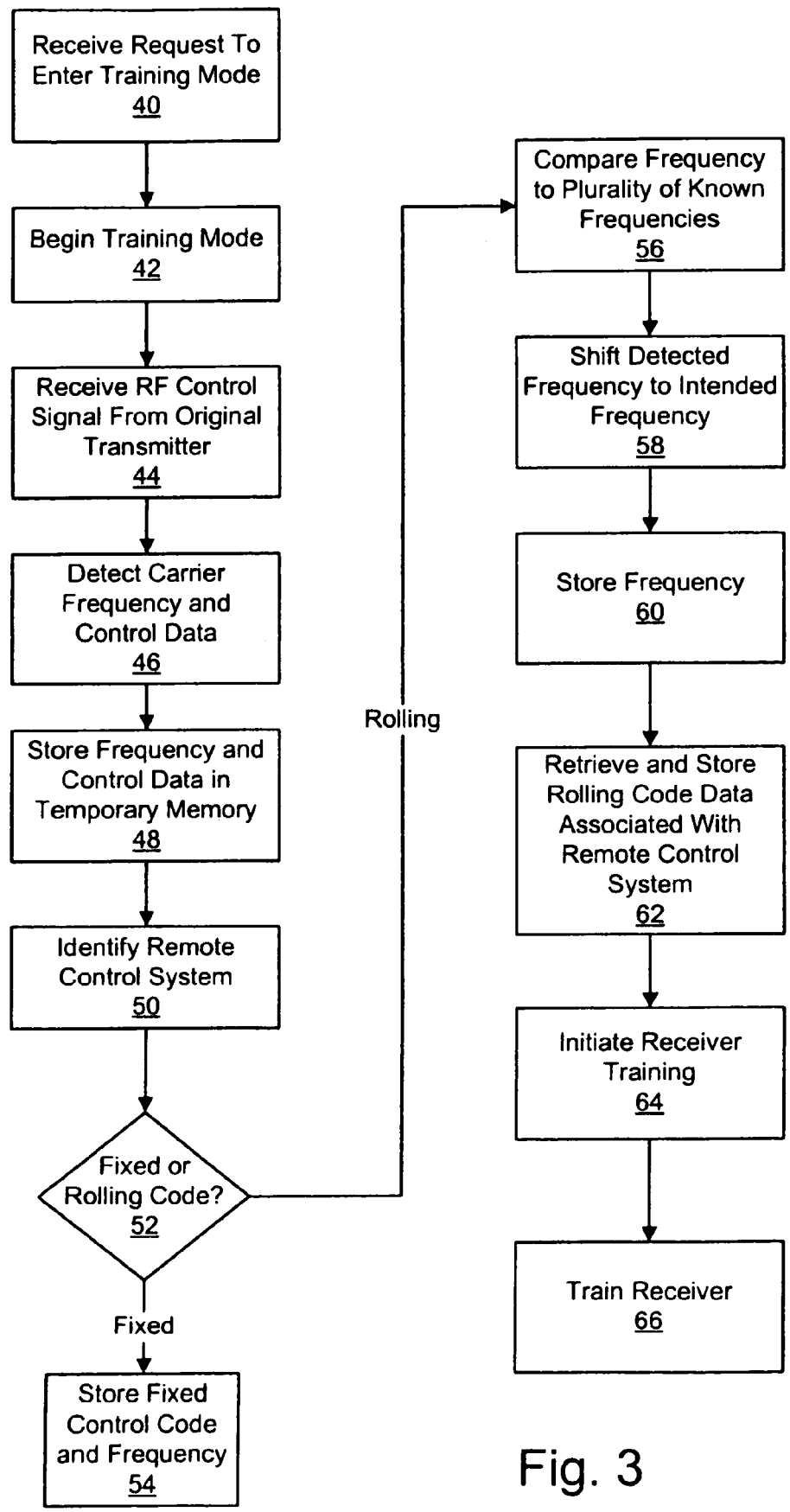
FIG. 3 illustrates a method for training a trainable transmitter in accordance with an embodiment.

FIG. 3 illustrates a method for training a trainable transmitter in accordance with an embodiment. The trainable transmitter and the original transmitter are brought within range of each other. At block 40, a request to enter a training mode is received from a user at the trainable transmitter. For example, a user may provide a request by actuating a pushbutton (e.g., pushbutton 26 in FIG. 2) of the trainable transmitter. In one embodiment, the user holds the pushbutton until feedback is provided that the training of the channel is complete. Alternatively, the user may hold the pushbutton for a predetermined amount of time (e.g., 3 seconds, 10 seconds, etc.). A display may be used to indicate to the user that a training mode was initiated, for example, a display element such as an LED indicator may flash to provide feedback to a user. In addition, the display element may be used to indicate that the channel is trained (e.g., a LED may flash rapidly). In alternative embodiments, a request to enter a training mode may be provided by a combination of key presses using input devices of the trainable transmitter, by receiving a message on a vehicle bus, upon receipt of a control signal from the original transmitter or by selecting a menu item on a display.

At block 42, the trainable transmitter enters a training mode and begins looking for a control signal to train the channel. In an exemplary embodiment, an original transmitter for a remote control system (e.g., original transmitter 12 in FIG. 2) is brought within the vicinity of the trainable transmitter and activated (e.g., a user input device of the original transmitter is actuated) to send an RF control signal, for example, a control signal with a rolling code. At block 44, the trainable transmitter receives the RF control signal from the original transmitter. The trainable transmitter detects and identifies a carrier frequency and/or control data of the received RF control signal at block 46. For example, the trainable transmitter may receive the rolling code signal from the original transmitter, demodulate the control signal and identify the control data and carrier frequency of the control signal. At block 48, the identified carrier frequency and control data are stored in temporary memory (e.g., volatile memory). For a rolling code signal, the control data may include a transmitter identifier (e.g., a serial number) and an encrypted counter value (or a hop code). A counter value in the original transmitter increments each time the button is pressed and is encrypted using an encryption algorithm to generate the encrypted counter value of the control signal.

Figure 4:
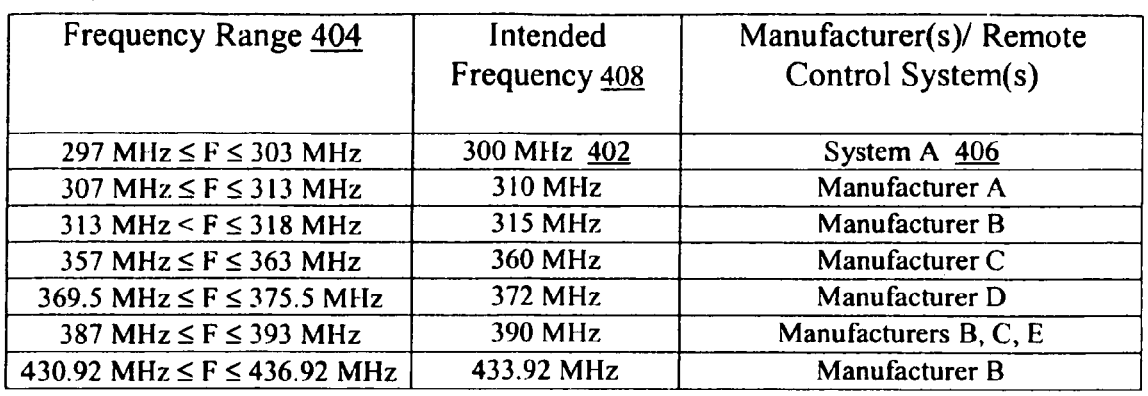
FIG. 4 is a list of exemplary frequency ranges in accordance with an embodiment.

At block 50, the characteristics of the control signal (e.g., the identified carrier frequency and/or control data, etc.) may be used to identify the type of remote control system (e.g., the manufacturer) associated with the original transmitter and whether the control data is fixed or rolling code. If the remote control system is a fixed code system at block 52, the fixed code and carrier frequency are stored in non-volatile memory at block 54 for later retransmission. In addition, the fixed code and carrier frequency are associated with an input device (e.g., pushbuttons 26, 28 and 30 of the trainable transmitter. If the control signal is a rolling code signal at block 52, the identified frequency of the original transmitter control signal is compared to a list of rolling code carrier frequencies at block 56. The list of rolling code carrier frequencies includes known frequencies for a plurality of rolling code remote control systems (or manufacturers). The list of known frequencies for rolling code systems is stored in memory of the trainable transmitter. In one embodiment, a range of frequencies and a system(s) or manufacturer(s) are associated with each known frequency as shown in FIG. 4. For example, in list 400 frequency 300 MHz (402) has an associated frequency range 404 of 297 MHz to 303 MHz and is associated with remote control system A (406). If the identified frequency of the original transmitter control signal falls within a frequency range 404 associated with a particular known carrier frequency 408, the identified frequency is shifted, "snapped" or changed to the frequency from the frequency list 400 associated with the frequency range 404 at block 58. The frequencies in list 400 represent known or intended frequencies for particular rolling code systems or rolling code system manufacturers. Returning to FIG. 3, the shifted frequency is then stored in non-volatile memory at block 60.

In addition, at block 62, rolling code data (e.g., an encryption algorithm and carrier frequency or frequencies) may be retrieved from memory based on the type of remote control system (i.e., as identified in block 50) and associated with the channel being trained for later retransmission. Once a trainable transmitter channel is trained, a user initiates a training mode for the receiver of the remote control system at block 64. For example, a user may actuate an input device such as a button coupled to the receiver. At block 66, the receiver is trained by, for example, learning an identifier of the trainable transmitter and synchronizing the counters of the trainable transmitter and the remote control system receiver. In an exemplary embodiment, a button on the trainable transmitter may be pressed, for example, two to three times, to transmit signals from the trainable transmitter to the receiver so that the receiver may learn the transmitter identifier, complete the synchronization of the receiver and trainable transmitter and conform that training was successful. Once the training process is complete, this information may be used to generate appropriate control signals (e.g., an appropriate rolling code signal) in response to subsequent actuation of an input device of the trainable transmitter associated with the trained channel.

While the exemplary embodiments illustrated in the FIGS. and described above are presently preferred, it should be understood that these embodiments are offered by way of example only. For example, alternative embodiments may be suitable for use in the commercial markets, wherein office lights or security systems or parking garage doors are controlled. Accordingly, the present invention is not limited to a particular embodiment, but extends to various modifications that nevertheless fall within the scope of the appended claims. The order or sequence of any process or method steps may be varied or re-sequenced according to alternative embodiments.

What is claimed is:

1. A method for training a trainable transmitter in a vehicle, the method comprising:

receiving a request to enter a training mode of the trainable transmitter from a user;

beginning a training mode of the trainable transmitter;

receiving a control signal from an original transmitter associated with a remote control system;

detecting a frequency and control data of the control signal;

determining if the control signal is a fixed code signal or a rolling code signal;

if the control signal is a fixed code signal, storing the detected frequency and control data for use during normal operation of the trainable transmitter without shifting the detected frequency; and if the control signal is a rolling code signal, comparing the detected control signal frequency to a plurality of predetermined frequencies and based on the comparison, shifting the detected frequency to match one of the predetermined frequencies, wherein the shifting occurs only when the control signal is a rolling code signal.

2. A method according to claim 1, wherein the plurality of predetermined frequencies are associated with at least one of remote control systems and manufacturers.

3. A method according to claim 1, wherein each of the plurality of predetermined frequencies are associated with a frequency range.

4. A method according to claim 3, wherein the step of comparing includes comparing the detected frequency to a frequency range to determine if the detected frequency is included in the frequency range.

5. A method according to claim 1, further including storing the shifted frequency and control data.

6. A method according to claim 1, wherein the trainable transmitter is integrated into a vehicle interior element.

7. A method according to claim 6, further including associating the stored frequency and control data with an input device coupled to the trainable transmitter.

8. A trainable transmitter, comprising:
a receiver configured to receive signals; and
a control circuit coupled to the receiver and configured to:
  receive a control signal from an original transmitter via the receiver,
  detect a frequency and control data of the control signal,
  determine if the control signal is a fixed code signal or a rolling code signal and if the control signal is a fixed code signal,
  store the detected frequency and control data and, only if the control signal is a rolling code signal, compare the detected control signal frequency to a plurality of predetermined frequencies and based on the comparison, shift the detected frequency to match one of the predetermined frequencies.

9. A system according to claim 8, wherein the plurality of predetermined frequencies are associated at least one of remote control systems and manufacturers.

10. A system according to claim 8, wherein each of the plurality of predetermined frequencies are associated with a frequency range.

11. A system according to claim 10, wherein the step of comparing includes comparing the detected frequency to a frequency range to determine if the detected frequency is included in the frequency range.

12. A system according to claim 8, further including a memory for storing the shifted frequency and control data.

13. A system according to claim 8, wherein the trainable transmitter is integrated into a vehicle interior element.

14. A system according to claim 13, further including an input device, wherein the control circuit is configured to associate the stored frequency and control data with the input device.

15. A trainable transmitter, comprising:
a receiver configured to receive signals; and
a control circuit coupled to the receiver and configured to:
  receive a control signal from an original transmitter via the receiver,
  detect a frequency and control data of the control signal,
  determine if the control signal is a fixed code signal or a rolling code signal and if the control signal is a fixed code signal,
  store the detected frequency and control data and, only if the control signal is a rolling code signal, compare the detected control signal frequency to a plurality of predetermined frequencies and based on the comparison, shift the detected frequency to match one of the predetermined frequencies, and
  generate a control signal in response to an actuation of an input device, the control signal including the control data and the detected frequency or the shifted frequency.

16. A system according to claim 15, wherein the plurality of predetermined frequencies are associated at least one of remote control systems and manufacturers.

17. A system according to claim 15, wherein each of the plurality of predetermined frequencies are associated with a frequency range.

18. A system according to claim 17, wherein the step of comparing includes comparing the detected frequency to a frequency range to determine if the detected frequency is included in the frequency range.

19. A system according to claim 15, further including a memory for storing the shifted frequency and control data.

20. A system according to claim 15, further including an input device, wherein the control circuit is configured to associate the stored frequency and control data with the input device.

* * * * *